United States Patent [19]
Richards

[11] 3,975,732
[45] Aug. 17, 1976

[54] SECOND DIFFERENCE FUNCTION GENERATOR

[75] Inventor: Gerald P. Richards, Framingham, Mass.

[73] Assignee: Raytheon Company, Lexington, Mass.

[22] Filed: Feb. 20, 1975

[21] Appl. No.: 551,575

Related U.S. Application Data

[62] Division of Ser. No. 445,179, Feb. 25, 1974.

[52] U.S. Cl.............................................. 343/16 R
[51] Int. Cl.².......................................... G01S 9/02
[58] Field of Search................................. 343/16 R

[56] References Cited
UNITED STATES PATENTS

| 3,500,402 | 3/1970 | Huele et al.................... | 343/16 R X |
| 3,683,380 | 8/1972 | Cantwell, Jr. et al............ | 343/16 R |

*Primary Examiner*—Malcolm F. Hubler
*Attorney, Agent, or Firm*—John R. Inge; Joseph D. Pannone; Milton D. Bartlett

[57] ABSTRACT

High accuracy function calculating apparatus using a minimum of components and storage locations. Second difference values of the function to be generated are stored in a read-only memory which is addressed by an incrementable and reversible address counter. A first accumulator circuit connected to the output of the read-only memory calculates the first difference values of the function. A second accumulator coupled to the output of the first accumulator calculates the values of the desired function. The apparatus is used to advantage in radar azimuth converter applications as well as in general purpose function calculating applications.

10 Claims, 5 Drawing Figures

SECOND DIFFERENCE FUNCTION GENERATOR

CROSS-REFERENCE TO RELATED APPLICATIONS

This is a division of application Ser. No. 445,179, filed Feb. 25, 1974.

BACKGROUND OF THE INVENTION

Radar systems frequently display received date in the PPI (Plan Position Indicator) mode of display operation. In such systems, data in the form of radar target echoes is written onto the cathode-ray tube display screen as the cathode-ray tube beam is swept outward from its start position by intensifying the cathode-ray tube beam during the time radar echoes are being received. The sweeps are started from the center at the same angle or azimuth as the radar antenna. Early methods for producing this type of radar display included one wherein a deflection coil mounted on the neck of the display cathode-ray tube was rotated at the same rate of rotation of the radar antenna. Synchronization between the deflection coil and radar antenna was maintained by driving both the radar antenna and deflection coil from the same motor shaft or by providing a separate motor for the deflection coil which in turn was connected in a servomechanism loop with the radar antenna. Current passed through the deflection coil caused the beam to move outward from the center of the screen.

Problems in those types of systems were numerous and difficult to overcome. Mechanical problems resulted when the deflection coil was mechanically linked to the radar antenna driving mechanism. Much maintenance was needed and typically a great deal of distracting noise was generated in the display console. Servomechanism driving loops tended to be expensive, take up large amounts of space, have a great deal of weight, and tended to be difficult to maintain. Moreover, in any of the rotating deflection coil systems it was not possible to start the deflection of the cathode-ray tube beam at other than the cathode-ray tube. This made the system difficult to use in many applications, especially when it was desired to view only a portion of the radar swept area as a magnified view.

Difficulties of rotating deflection coil systems were partially overcome by providing a cathode-ray tube display system with two stationary deflection coils with separate drive and amplification circuitry for each coil. An input signal applied to one channel of such a display system caused the beam to be deflected in the horizontal or X direction from the center of the screen while an input signal applied to the other channel caused the beam to be deflected in the vertical or Y direction. Means was provided at the radar antenna for sensing the pointing angle relative to north or azimuth of the radar antenna and converting the azimuth to X and Y signals to deflect the beam of the cathode-ray tube.

In one such system, a rotatable variable capacitor was connected to the rotating radar antenna shaft wherein the capacitance was varied as a function of the antenna azimuth. Circuitry was provided to convert the capacitance value to X and Y signals representing respectively the cosine and sine of the radar antenna azimuth. A ramp waveform was generated and the amplitude of the ramp multiplied or modulated by the cosine of the azimuth for the X channel and by the sine of the azimuth for the Y channel. The ramp signal was started by the same triggering signal which caused the radar transmitter to generate the transmitted radar pulse. The ramp signals as so modulated were then amplified and coupled to the X an Y deflection coils. This system overcame some of the mechanical problems of the previously described rotating deflection coil systems but further problems were introduced. The magnitude of the capacitance used and the magnitude of the capacitance changes effected by the rotation of the radar antenna were relatively small. As the radar antenna is located in a mechanically and electrically noisy environment, noise was frequently introduced into the system resulting in poisitional inaccuracies caused by distortions of the cosine and sine values of the azimuth.

More modern systems have employed digital azimuth converters. In some of such systems, the 360° radar antenna rotation is divided into a number of small sectors and a pulse is generated as the antenna passes the boundary between sectors. These pulses are termed in the art ACP's (azimuth change pulses). Additionally, a second pulse is generated each time the radar antenna passes a chosen reference such as north heading. This pulse has been termed the ARP (azimuth reference pulse). A digital circuit is then provided which counts the number of ACP pulses which have occurred since the preceding ARP pulse and thereby generates the sine and cosine values knowing at which angles the ACP pulses occur. The earliest and most straight forward method for digitally producing these sine and cosine values was to store sine and cosine values directly for each of the possible sector boundary crossings. Large amounts of storage were thereby required as typically several thousand sector crossings were typically employed and typically 15 or more bits of accuracy for sine and cosine values were required to achieve acceptable presentations on typical sizes of radar display cathode-ray tubes. Another method employed was to store the values of the differences of adajcent tabular values of the sine and cosine functions and to add these differences to the preceding values of sine and cosine respectively to obtain a present value of these functions. Although this method decreased the required storage capacity, still relatively large amounts of storage were required to obtain the 16 to 18 bit accuracies required for large screen radar displays, especially those displays in which it is desired to offset the sweep start from the center of the cathode-ray tube screen and disply only a portion of the radar swept area.

SUMMARY OF THE INVENTION

The above objections of the prior art as well as others may be overcome by providing the combination of means for storing second or higher order differences of a function and means for producing values of that function from those differences. The function may be trigonometric and may be sine, cosine or both. First difference values are produced from the second difference values and the function values are produced from the first difference values. Accumulators may be provided for performing these two functions.

In a preferred embodiment, difference values of a function are stored in data storage means which is addressed by sequential addressing means which preferably may be a counter. The data storage means output is coupled to first adder means and first register means is coupled to the output of the first adder means.

Second adder means is coupled to the output of the first register means and second register means is coupled to outputs of the second adder means. The data storage means is preferably a readonly memory with second difference values stored therein. Outputs of the first register means may be coupled to inuts of the first adder means and outputs of the second register means may be coupled to inputs of the second adder means. The register means is preferably means for temporarily storing a binary number of two or more bits and may have flip-flop storage for each bit.

An azimuth converter constructed in accordance with the present invention includes means coupled to a radar antenna for producing azimuth change pulses at spaced intervals. Means for producing a binary count in response to the azimuth change pulses is coupled to first and second memory means which each store portions of cosine and sine second difference values. Inputs of first cosine and sine adder means are alternately coupled to the first and second memory means. First cosine and sine register means are coupled to the respective cosine and sine adder means and second cosine and sine register means are coupled to the respective adder means. There may further be provided octant counting means coupled to the means for producing a binary count where the octant counting means changes state once for each 45° change in radar antenna azimuth angle. The octant counting means causes the alternately coupling means to switch. In a preferred embodiment, sequentially spaced second difference values of the sine function between 0° and 45° are stored in the first memory means while sequentially spaced second difference values of the cosine function between 0° and 45° are stored in the second memory means. The first cosine adder is coupled to the second memory means for odd numbered octants and to the first memory means for even numbered octants while the first sine adder is coupled to the first memory means for odd numbered octants and to the second memory means for even numbered octants. The even numbered octants are radar antenna azimuths between 0° and 45°, 90° and 135°, 180° to 225°, and 270° to 315° while odd numbered octants are between 45° and 90°, 135° and 180°, 225° to 270°, and 315° to 360°.

A radar system using the present invention to advantage may be constructed by providing the combination of means for transmitting radar pulses, means for receiving returned radar echoes that is signals bounced from targets and intercepted by the radar antenna, means coupled to the radar antenna for producing azimuth change pulses as the antenna is rotated, means for producing a binary count in response to the azimuth change pulses, means for storing second difference values of the cosine and sine functions, and means for calculating values of the cosine and sine functions from the second difference values for each azimuth change pulse, one value of each function being calculated for each pulse. Moreover, displaying means may also be provided, specifically a cathode-ray tube display including therein means for deflecting the beam of the cathode-ray tube at an angle determined by the produced cosine and sine values. The beam deflecting means may comprise means for multiplying algebraically the cosine and sine function values by an internally stored standard stroke length, accumulator means coupled to the output of the multiplying means, means for producing an analog voltage corresponding to the output from the multiplying means, and means for producing a deflecting field in response to the analog voltage. In a practical display system with X and Y channels, there may be either a shared multiplier or one multiplier for each channel. There may be two beam deflecting means, one for each channel. Means may be provided for interpolating between values of the cosine and sine functions calculated at the time of the azimuth change pulses.

To reduce bandwidth, channel capacity requirements, or data storage or handling capacity requirements, a system may be constructed having means for producing second or higher difference values of a function and means for transmitting the difference values. Function here includes a time varying digital or analog signal or any other information desired to be transmitted. Furthermore, means may be provided for receiving the transmitted difference values and for producing values of the function from the difference values. The difference values may be stored in a read-only memory before being transmitted. One or more accumulator means may be provided to produce values of the function.

DESCRIPTION OF THE PREFERRED EMBODIMENT

Figure 1:
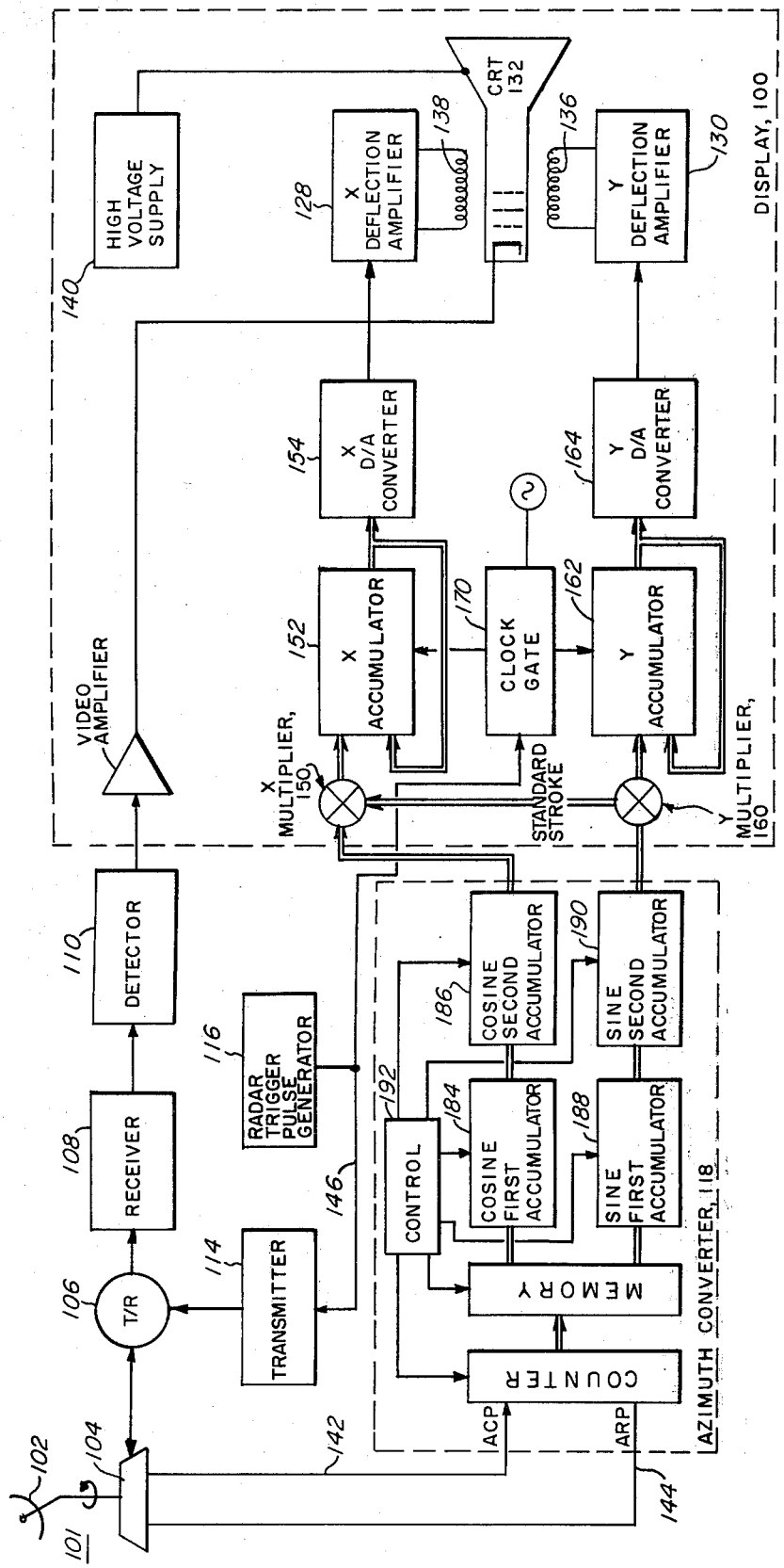
FIG. 1 is a block diagram of a radar and display system in which the present invention is used to advantage.

Referring now in particular to FIG. 1, there is shown a block diagram of a radar system including a cathode-ray tube display 100, radar transmitter 114 and receiver 108, azimuth converter 118, and radar antenna assembly 101. Transmission of radar signals from the radar system is initiated by a pulse from radar trigger pulse generator 116 produced at predetermined time intervals. These pulses trigger into operation radar transmitter 114 which produces and amplifies an appropriate signal waveform for the particular radar system employed. A number of different types of waveforms may be used, such as a linear chirped waveform or a Barker coded waveform depending upon parameters such as resolution and distance required. The output of transmitter 114 is coupled through transmit/receive switch 106 to radar antenna 102. Radar antenna 102 is also used for the reception of returned radar echo signals. The returned signals are coupled back through transmit/receive switch 106 to radar receiver 108 including therein appropriate RF and IF circuitry. After processing by radar receiver 108, the received signals are detected and brought to baseband by detector 110 before being coupled to video amplifier 112 of display 100.

Inside of radar base 104 is contained a radar antenna rotating motor and radar antenna shaft position sensing and sending circuitry. The 360° of radar antenna rotation is divided into a number of small equally spaced sectors. One ACP (azimuth change pulse) is produced on line 142 each time the radar antenna passes a sector boundary. For the preferred embodiment, there are 4096 sectors although any practical number could be used depending upon the azimuth resolution required in the particular radar system application. One ARP (azimuth referenc pulse) is prouduced on line 144 each time the radar antenna passes North reference. The ACP and ARP pulses as well as the radar trigger pulse are coupled to azimuth converter 118. Each time a radar trigger pulse is sensed by azimuth converter 118, sine $\theta$ and cosine $\theta$, $\theta$ being the azimuth angle of radar antenna 101, as computed by azimuth converter 118 are coupled to display 100. Azimuth converter 118 determines the cosine $\theta$ and sine $\theta$ data from the sector in which the radar antenna is directed between sensed ACP pulses. This sector is in turn determined by the number of ACP pulses which have occurred since the occurrence of the last ARP pulse.

Counter 180 in azimuth converter 118 counts the number of ACP pulses which have occurred since the last ARP pulse. Memory 182 has stored therein second difference values of the cosine and since functions. Cosine first accumulator 184, cosine second accumulator 186, sine first accumulator 188, and sine second accumulator 190 calculate the functional values of cosine $\theta$ and sine $\theta$ in a manner to be described in conjunction with the discussion of FIGS. 2, 3 and 4.

Since in some embodiments, the radar trigger pulse may not be synchronous with the ACP pulse, interpolation may be performed between value of cosine $\theta$ and sine $\theta$ corresponding to the sector boundaries. Increased azimuth resolution is obtained thereby if required by overall system accuracy requirements. Additional registers are added to azimuth converter 118 at the outputs of accumulators 186 and 190 to perform the interpolation.

Display 100 includes circuitry which converts the cosine $\theta$ sine $\theta$, radar trigger and detected radar signal inputs into the apropriate form for visual presentation to the radar system operator. The beam of cathode-ray tube 132 is moved across the face of the screen by a vector stroke technique. With this technique, the beam is moved in a continuous series of small increments or strokes along the desired locus. This is accomplished by resolving the increment or stroke length into X and Y components. The beam is started from the center of the cathode-ray tube screen, or other desired starting position, and the X and Y components of the stroke are added to the start position and the cathode-ray tube beam is moved along to the new position thus computed. The X an Y components are added to the previously computed position thus moving the cathode-ray tube beam along to a third position. The process continues in this manner until the end point of the locus is reached.

With the present preferred embodiment, a binary number corresponding to a standard stroke with length equal to the radius of the cathode-ray tube screen divided by the maximum number of strokes used to track the longest available radar range is internally stored. The standard stroke is multiplied by cosine $\theta$ by X multiplier 150 and by sine $\theta$ by Y multiplier 160. X and Y multipliers 150 and 160 may be serial or parallel digital multipliers or alternatively the multiplications may be performed in an external computer. The standard stroke multiplied by cosine $\theta$ and sine $\theta$ forms the X and Y resolved components respectively. X and Y accumulators 152 and 162 are initialized to the desired start position. When a radar trigger pulse is received on line 146, clock gate 170 opens permitting the register clocking signal from clock 172 to be coupled to the registers of X and Y accumulators 152 and 162. The resolved X and Y components are then cyclically and sequentially added to the preset start position until the edge of the screen or other desired end point has been reached. Clock gate 170 is then shut off and X and Y accumulators 152 and 162 are reset to the desired start position so that the process may be repeated when the next radar trigger pulse is received.

X and Y D/A converters 154 and 164 convert the digital outputs of X and Y accumulators 152 and 162 to corresponding analog waveforms. X and Y deflection amplifiers 128 and 130 amplify the analog signals and couple them to X and Y deflection coils 138 and 136 respectively. High voltage supply 140 provides the final anode accelerating potential for cathode-ray tube 132.

Figure 2:
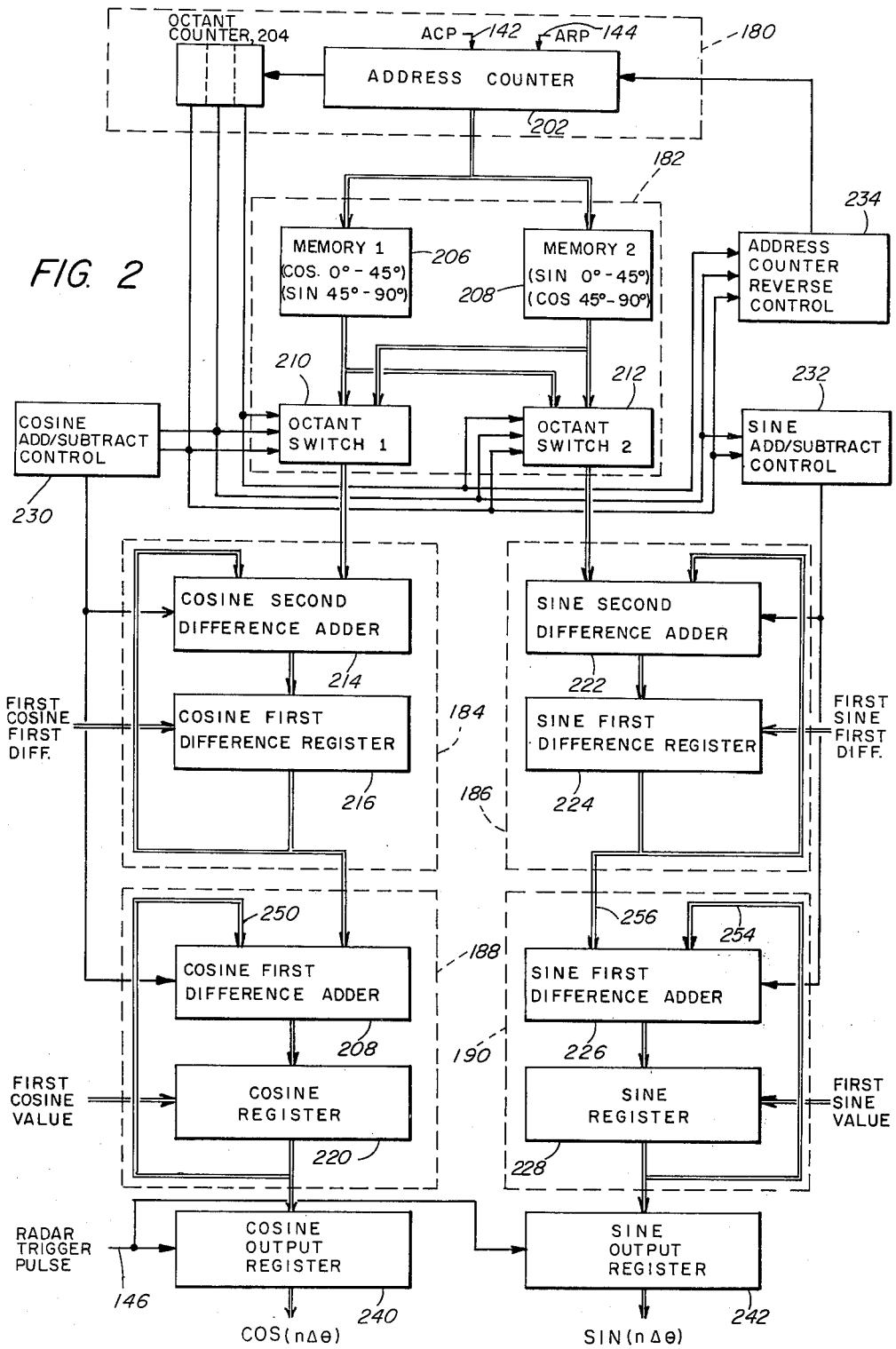
FIG. 2 is a block diagram of an azimuth converter used in the system of FIG. 1 wherein the present invention is further used to advantage.
Figure 3:
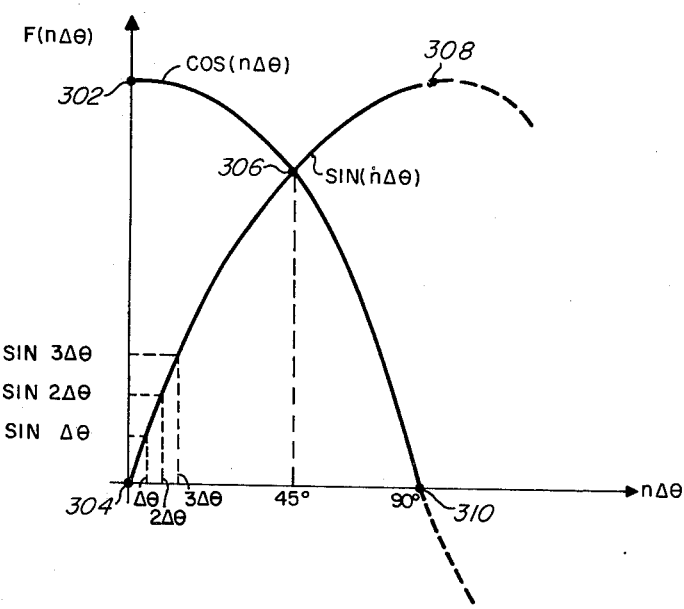
FIG. 3 is a graph of portions of the sine and cosine functions used in the discussion of the operation of an azimuth converter constructed in accordance with the teachings of the present invention.
Figure 4:
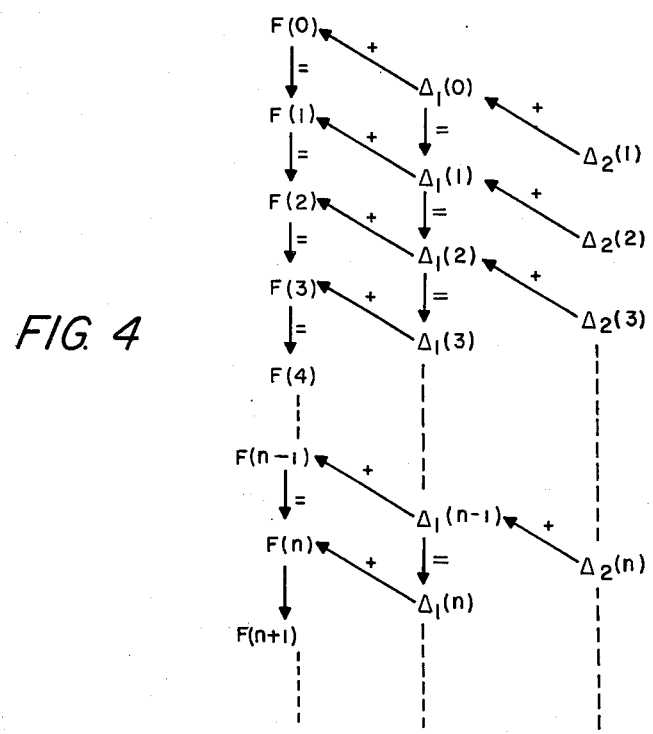
FIG. 4 is a table of functional values, first differences, and second differences of that function illustrating how computations in accordance with the present invention are to be performed.

Referring now more particularly to FIGS. 2, 3 and 4, the operation of the azimuth converter 118 of FIG. 1 will be described in detail. ACP pulses on line 142 advance address counter 202 by one count for each pulse. Address counter 202 in the preferred embodiment is a 9-bit binary counter that is capable of counting from 0 to 511 and which is also reversible so that it may count backwards from 511 to 0. Counting between 0 and 511 or between 511 and 0 represents progressing through one octant or 45° of the 360° radar antenna rotation cycle. Address counter 202 is reset to 0 as the antenna passes north reference by an ARP pulse on line 144. The carry bit from the highest bit position of address counter 202 advances three-bit octant counter 204. Octant counter 204 starts at the 000 state for the first octant and advances to the 111 state for the eighth octant. Memory-1 206 and memory-2 208 in the preferred embodiment may both be incorporated into the same read only memory integrated circuit. Memory-1 206 stores 512 evenly spaced values of the second difference of sine $\theta$ from 0° to 45° (equivalent in value to cosine $\theta$ from 45° to 90°) while memory-2 208 stores 512 second difference values of cosine $\theta$ from 0° to 45° (equivalent in value to sine $\theta$ from 45° to 90°). These are numbered consecutively from 0 to 511.

Address counter reverse control 234 operates upon the 3-bit output of octant counter 204 producing a control signal which causes address counter 202 to count in the forward direction for the first, third and all odd numbered octants while counting in the reverse direction for the second, fourth and all even numbered octants. Octant counter 204 is reset to the 000 state by an ARP pulse on line 144 as is address counter 202. At the start of a cycle after an ARP pulse has reset address counter 202 and octant counter 204, memory-1 produces sequentially on its output lines second differences of cosine $\theta$ between 0 and 45° as address counter 202 advances from 0 to 511. Octant switch-1 210 then couples the output of memory-1 206 to cosine second difference adder 214 while octant switch-2 212 couples the output of memory-2 208 to sine second difference adder 222. This corresponds respectively to moving along from point 304 to 306 as in FIG. 3 for memory-1 206 and cosine second difference adder 214 and moving from point 302 to point 306 for memory-2 208 and sine second difference adder 222.

It is to be noted that the sine and cosine functions are symmetrical about 45° so that that portion of the cosine curve between 0° and 45° has the same value at evenly spaced sequential values as the sine curve from 45° to 90° only in reverse order. Hence, when the 45° point is reached, it is not necessary to store further second difference values but only necessary to switch memories to the second difference adders 214 and 222 from which the second difference values are extracted as well as reversing the direction of count for address counter 202. The cosine and sine functions are also similarly symmetrical in the other quadrants with a sign change being all that is necessary to compute the correct values of cosine and sine.

In FIG. 4 is shown a table illustrating how a function is computed from its first and second difference values and how the first and second difference values may be initially calculated from the functional value. $F(0)$, $F(1), \ldots, F(n), F(n+1)$ are the values of the desired function at evenly spaced points $0, 1, \ldots, n, n+1$. $\Delta_1(0)$, the first first difference value, is the difference $\Delta_1(0) = F(1) - F(0)$ or, more generally, $\Delta_1(n) = F(n+1) - F(n)$. $\Delta_2(1)$, the first second difference value, is the difference $\Delta_2(1) = \Delta_1(1) - \Delta_1(0)$ or, more generally, $\Delta_2(n) = \Delta_1(n) - \Delta_1(n-1)$. All the first and second differences can then be calculated from a prior knowledge of the tabular values of the desired function.

The process may be reversed, as is done with the present invention, and all the tabular values of the function may be calculated in order when there has been stored only the first function value $F(0)$ and the first first difference $\Delta_1(0)$ an all the second difference values $\Delta_2(1), \Delta_2(2), \ldots, \Delta_2(n), \ldots$. The calculations start by adding $\Delta_1(0)$ to $F(0)$ to obtain $F(1)$. Simultaneously, $\Delta_2(1)$ is added to $\Delta_1(0)$ to obtain $\Delta_1(1)$. Then $\Delta_1(1)$ is added to $F(1)$ to obtain $F(2)$. The process is continued calculating the next function value from the previous function value and current first difference, i.e., $F(n) = F(n-1) + \Delta_1(n-1)$ and the next first difference value from the previous first difference value and the current second difference, i.e., $\Delta_1(n) = \Delta_1(n-1) + \Delta_2(n)$.

For the preferred embodiment of an azimuth converter constructed in accordance with the teachings of the present invention there are 4096 cosine and sine values equally spaced between 0° and 360° or 512 values in each octant of 45°. This corresponds to an incremental angle between values and second difference values of $\Delta\theta = 45°/512$. Memories 206 and 208 are read only memories pre-programmed with second difference values calculated in accordance with the above discussion by first calculating the function values to a sufficient precision to obtain the required bit accuracy. The first and second differences are obtained and the memories programmed with the second difference values in binary form.

Of course, some rounding or truncation error must be accommodated since the cosine and sine functions are incapable of exact numeric expression. The number of bits of second difference values stored will determine the ultimate precision of the computed function values. It has been determined that with only four stored bits of second difference values of cosine and sine that it is possible to calculate the cosine and sine functions precisely to $18 \pm \frac{1}{2}$ binary places. Only four different second difference values are needed. Hence, it is possible to code them with only two binary bits. The four second difference values are $-2 \times 2^{-18}$, $-1 \times 2^{-18}$, 0, and $+1 \times 2^{-18}$ which can be represented by 10, 11, 00, and 01 respectively. More accuracy can be obtained by storing more bits in memory. However, 18 bits of precision for cosine and sine values has been found to be sufficient for most radar display applications.

It is to be noted that there is a tremendous reduction in storage requirements when the present invention is used. To store the functions directly would require almost 150,000 bits of storage or sightly less than 20,000 bits for one octant. To store only the first differences requires more than 10,000 bits for one octant. But, with the present invention only 1024 bits are required for the same precision. Further accuracy can be obtained using third or higher differences but with higher ratios of bits stored per precision obtained.

In the first quadrant, the slope of the cosine function is negative and hence the second difference values of the cosine function are subtracted while the slope of the sine function in the first quadrant is positive and the second difference values of the sine function are added. In the second quadrant the slopes of both functions are negative and both second difference values are subtracted. In the third quadrant, the slope of the cosine function is positive and the slope of the sine function is negative so that the second difference values of the cosine function are added while the second difference values of the sine function are subtracted. In the fourth quadrant, the slopes of both cosine and sine functions are positive and hence the second difference values of both functions are added. Cosine add-subtract control 230 and sine add-subtract control 232 sense the two higher order bits of octant counter 204, those being an indication of the quadrant to which the radar antenna is currently directed, and from this produce an output control line to cosine second difference adder 214 and cosine first difference adder 208 and to sine second difference adder 222 and sine first difference adder 226 respectively to instruct these adders whether to add or subtract. Adder here is used in a generic sense as subtraction in binary circuitry may be accomplished by taking the two's complement of one of the addends and adding. All of the adders in this circuitry may, for example, be a Texas Instruments Co. integrated circuit No. SN74181, which has the described add-subtract control feature.

Cosine second difference adder 214 and cosine first difference register 216 form cosine first accumulator 184. As in all the accumulator circuits described herein, the outputs from the adder are coupled directly to the register and the register outputs are fed back to one set of inputs to the adder. Hence, whenever the register is clocked, the number on the second set of inputs to the adder is added to the number then in the register and the result put back into the register. The process is repeated each time the register is clocked. Similarly, sine second difference adder 222 and sine first difference register 224 form sine first accumulator 186, cosine first difference adder 208 and cosine register 220 form cosine second accumulator 186, and sine first difference adder 226 and sine register 228 form sine second accumulator 190.

When an ARP pulse on line 144 is received, the first cosine first difference is set into cosine first difference register 216 and first sine first difference is set into sine first difference register 224. These registers may, for example, comprise Texas Instruments Co. ingtegrated cirucit No. SN 7474 wherein provision is made for jamming in an external input data.

In the preferred embodiment, a linear interpolation is made between ACP pulses since the radar trigger pulse may not be precisely coincident with the ACP pulse. To accomplish the linear interpolation, the outputs of the cosine and sine first difference registers 216 and 224 are not added directly to the present position as stored in cosine and sine registers. Instead, the output lines from cosine first difference register 216 and sine first difference register 224 on lines 252 and 256 are uniformly shifted to lower bit positions down the cosine and sine first difference adders 208 and 226 by a predetermined number of bit positions, for example 6 in the preferred embodiment. For that case, $2^{-6} = 1/64$th of the total first difference will be added to the present position for each clocking of cosine and sine registers 220 and 228. Then 64 additions are performed between ACP pulses by clocking cosine and sine registers 220 and 228 64 times so that the correct values of sine and cosine will have been computed by the time of arrival of the next ACP pulse. A radar trigger pulse on line 146 causes cosine output register 240 and sine output register 242 to load the value of cosine and sine in the cosine register 220 and sine register 228 at the time of appearance of this radar trigger pulse which may be at any time or times between ACP pulses.

Figure 5:
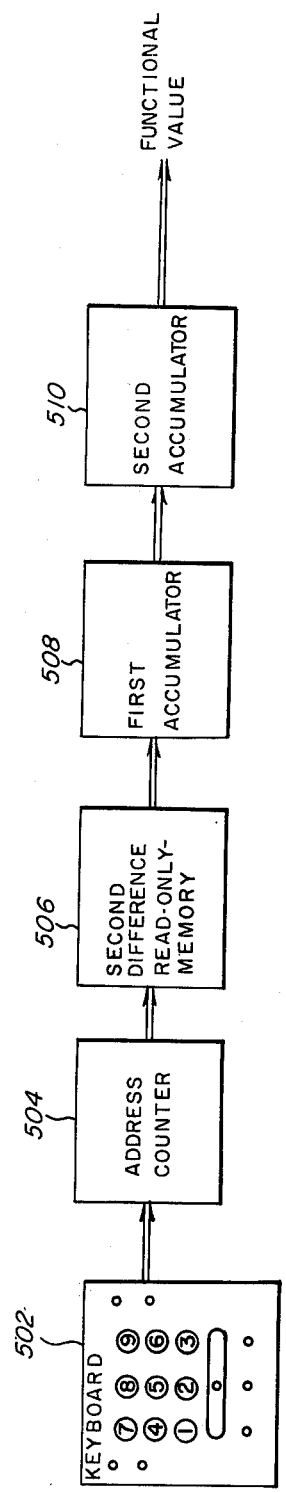
FIG. 5 is a block diagram of a calculator in which the present invention is used to advantage.

The present invention may also be used to advantage to compute values of trigonometric and other functions in calculator and computer circuitry. In FIG. 5 is shown a simplified block diagram of a calculator employing the present invention. The argument of the function to be calculated is entered upon keyboard 502 by the calculator operator. Address counter 504 starts counting from 0 or another preset value and is stopped when the keyboard entered value is reached. Second difference read only memory 506 produces a second difference value of the desired function for each count of address counter 504. First accumulator 508 and second accumulator 510, which can be pre-existing registers and adders within the calculator, accumulate the second difference values producing the desired functional value. The register within first accumulator 508 is initialized to the first first difference value of the function while the second accumulator 510 is initialized to the value of the function corresponding to the argument from keyboard 502 to address counter 504.

Although specific embodiments of the invention have been described, numerous modifications and changes would be apparent to one skilled in the art without departing from the spirit and scope of the present invention.

I claim:

1. An azimuth converter for producing values of the sine and cosine of the azimuth angle of a radar antenna comprising in combination:
   means coupled to a radar antenna for producing pulses at spaced azimuth angle intervals;
   means for producing a binary count in response to said pulses, one or more count inputs of said count producing means being coupled to said pulse producing means;
   first memory means for storing a first 45° portion of second difference values of cosine and sine functions;
   second memory means for storing a second 45° portion of said second difference values of said sine and cosine functions, address inputs of said first and second memory means being coupled to count outputs of said count producing means;
   first cosine adder means;
   first sine adder means;
   means for alternately coupling addend inputs of said first cosine adder means to data outputs of said first and second memory means;
   means for alternately coupling addend inputs of said first sine adder means to data outputs of said first and second memory means;
   first cosine register means having data inputs coupled to sum outputs of said first cosine adder means;
   first sine register means having data inputs coupled to sum outputs of said first sine adder means;
   second cosine adder means having addend inputs coupled to data outputs of said first cosine register means;
   second sine adder means having addend inputs coupled to data outputs of said first sine register means;
   second cosine register means having data inputs coupled to sum outputs of said second cosine adder means; and
   second sine register means having data inputs coupled to sum outputs of said second sine adder means.

2. The combination of claim 1 further comprising octant counting means comprising a three bit binary counter, said octant counting means being coupled to said means for producing a binary count and the count output of said octant counting means changing by one count for each 45° of azimuth angle change.

3. The combination of claim 2 wherein said means for alternately coupling inputs of said first cosine adder to said first and second memory means and said means for alternately coupling inputs of said first adder means to said first and second memory means operates in response to said count output of said octant counting means.

4. The combination of claim 2 wherein sequentially spaced second difference values of said sine function between 0° and 45° are stored in said first memory means and sequentially spaced second difference values of said sine function between 45° and 90° are stored in said second memory means.

5. The combination of claim 3 wherein said first cosine adder is coupled to said data outputs of said second memory means for odd numbered octants and to said data outputs of said first memory means for even numbered octants and said first sine adder is coupled to said data outputs of said first memory means for odd numbered octants and to said data outputs of said second memory means for even numbered octants.

6. A radar and display system comprising in combination:
   means for transmitting radar pulses;
   means for receiving returned radar echoes;
   radar antenna means coupled to said transmitting and receiving means;
   means coupled to said radar antenna means for producing azimuth change pulses as said antenna is rotated;
   means for producing a binary count in response to said pulses;
   means for storing second difference values of cosine and sine functions, address inputs of said storing means being coupled to count outputs from said count producing means;

first and second sine function accumulator means, inputs of said first sine function accumulator means being coupled to data outputs of said storing means and inputs of said second sine function accumulator means being coupled to outputs of said first sine function accumulator means, said first and second sine function accumulator means each performing one accumulation operation in response to one of said azimuth change pulses, said first sine function accumulator means producing values of the first difference of sine function from said second difference values and said second sine function accumulator means producing values of said sine function from said first difference values; and first and second cosine function accumulator means; inputs of said first cosine function accumulator means being coupled to data outputs of said storing means and inputs of said second cosine function accumulator means being coupled to outputs of said first cosine function accumulator means, said first and second cosine function accumulator means each performing one accumulation operation in response to one of said azimuth change pulses, said first cosine function accumulator means producing values of the first difference of the cosine function from said second difference values and said second cosine function accumulator means producing values of said cosine function from said first difference values.

7. The combination of claim 6 further comprising means for displaying radar information in response to said returned radar echoes.

8. The combination of claim 7 wherein said displaying means comprises a cathode-ray tube display.

9. The combination of claim 8 wherein said cathode-ray tube display comprises means for deflecting the beam of a cathode-ray tube of said cathode-ray tube display at an angle determined by said cosine and sine function values comprising in combination:
means for multiplying said cosine and sine function values by a standard stroke length;
accumulator means coupled to an output of said multiplying means;
means for producing an analog voltage corresponding to one or more outputs from said accumulator means; and
means for producing a deflecting field in response to said analog voltage.

10. The combination of claim 6 further comprising means for interpolating between values of said cosine and sine functions calculated at the time of occurrence of said azimuth change pulses.

* * * * *